May 12, 1953  F. S. SPRING  2,638,379
REAR WINDOW FOR CONVERTIBLE AUTOMOBILE TOPS
Filed Jan. 25, 1950
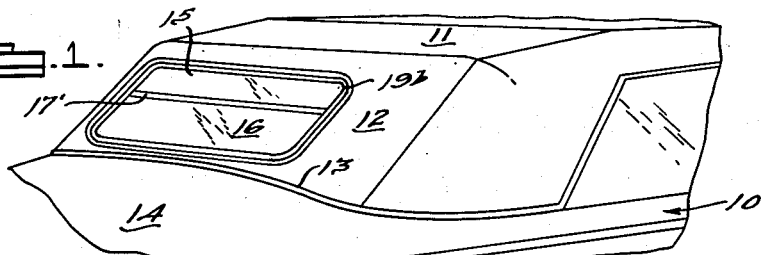
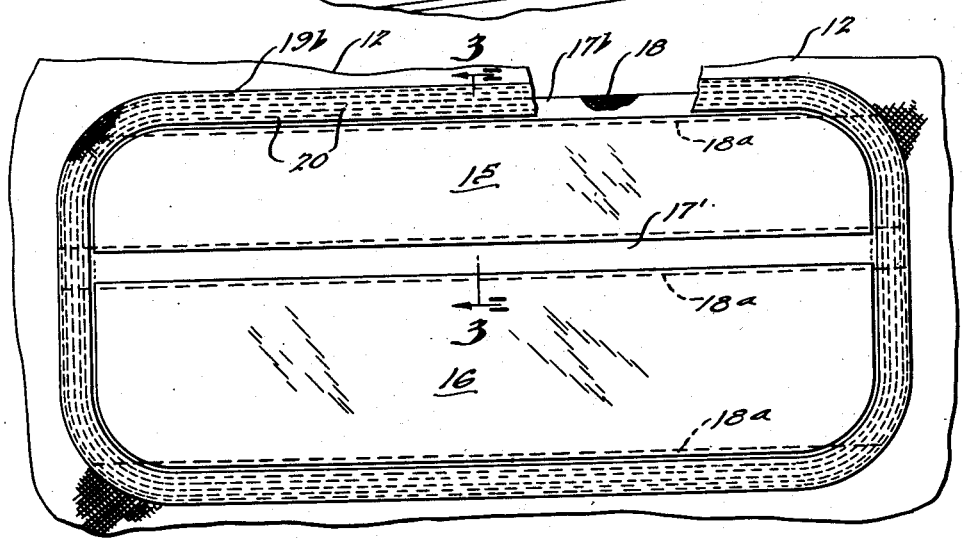
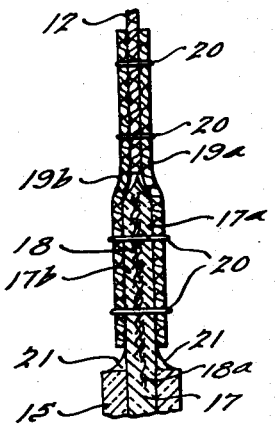
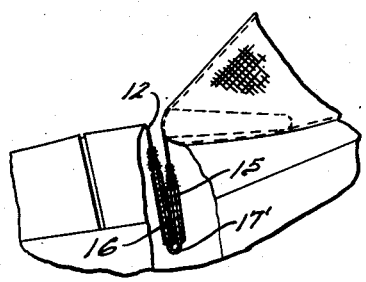
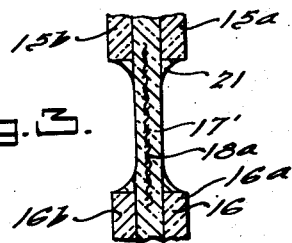
INVENTOR.
Frank S. Spring.
BY
Elmer Jamison Gray
ATTORNEY.

Patented May 12, 1953

2,638,379

UNITED STATES PATENT OFFICE 2,638,379

REAR WINDOW FOR CONVERTIBLE AUTOMOBILE TOPS

Frank S. Spring, Grosse Pointe, Mich., assignor to Hudson Motor Car Company, Detroit, Mich., a corporation of Michigan Application January 25, 1950, Serial No. 140,461

3 Claims. (Cl. 296—145)

This invention relates to window panels, especially to a folding rear window panel for a vehicle body of the convertible type having a foldable or collapsible top assembly, and is a continuation-in-part of Patent No. 2,560,493 issued July 10, 1951.

In accordance with conventional practice, the foldable top for the usual convertible automobile body comprises a flexible fabric covering for the vehicle tonneau. Mechanism is usually provided for folding the top into a unit at the rear of the body, or for raising the top to the cover position over the tonneau. A rear window for the top usually comprises a glass panel mounted in an opening in the rear portion of the foldable top material and secured to the latter around the edges of the glass panel. This rear window panel commonly comprises a safety glass fabricated by laminating two glass panes together with a flexible transparent sheet of resinous or plastic material forming the bond therebetween. In order to provide a marginal attaching strip by which the panel is attached to the fabric top material, the plastic bonding sheet is frequently extended beyond the marginal edges of the window panel.

Heretofore difficulty has been experienced in satisfactorily securing the marginal edges of the panel, or the extended plastic attaching strips if such are provided, to the fabric material of the top. After the top has been raised and lowered a number of times, it pulls away from the window panel long before other portions of the top become unserviceable as a result of ordinary wear.

In order to assure adequate rear vision for the operator of the vehicle, especially in modern convertible bodies where the back portion of the foldable top slopes gradually from the rear supporting bow toward the rear of the body, it is necessary to provide a rear glass panel of relatively large dimensions between its upper and lower edges. However when it is sought to use such a large rear window, the glass panel impedes or interferes with the folding action of the top.

In order to overcome this difficulty, the rigid glass panes of the window panel are provided in two or more sections hinged together by means of the interposed transparent flexible plastic bonding sheet which extends continuously throughout the panel area. This construction permits use of a rear window panel of adequate size to afford the necessary rear vision when the top is in the raised or cover position and which will fold compactly when the top is lowered and folded rearwardly.

Although the aforementioned bonding sheet interposed between the glass panes of the panel is sufficiently flexible to serve as a hinge or fold line between the rigid glass sections of the panel and is also satisfactorily transparent to afford the required rear vision, it is comparatively stiff in its folding action and will yield only to a comparatively strong folding force, which of course is transmitted to the panel through the flexible top material in a folding or unfolding action. Thus additional stress tending to rupture the seam or connection between the top material and the marginal edges of the window panel is exerted in operating the collapsible top structure.

It is accordingly an important object of the present invention to provide an improved folding window panel having a superior reinforced hinge or fold line and improved reinforcement means at the marginal edges of the panel for attachment to the foldable top material of a convertible type automobile, so that the fold line or hinge and the seam or connection between the panel and top material will withstand the normally expected abuse and rupturing forces exerted thereon as a result of operation of the foldable top.

Another object is to provide a folding window panel wherein the interposed bonding sheet comprises two superimposed layers which project from the marginal edges of the panel and are bonded securely to a tough marginal reinforcing strip of fabric or other suitable material interposed therebetween, whereby the marginal edges of the panel may be secured to the fabric of the collapsible top at an efficient, strong, long lasting connection, as for example by sewing, stapling, or other fastening means.

Still another object is to provide a folding window panel of the foregoing character wherein the marginal reinforcing strips are in turn backed and reinforced by fabric strips of strong coarsely woven fibres which are extended inward a short distance between the marginal edges of the layered glass panels. In a preferred construction, a similar coarsely woven strip is interposed between the flexible plastic bonding layers along each fold line and extended above and below the same a short distance between the adjacent edges of the layered glass panels. Thus stretching or tearing of the flexible bonding material comprising the fold or hinge between adjacent glass panel sections or extending beyond the marginal edges of the panel are avoided.

Other objects of this invention will appear in the following description and appended claims, reference being had to the accompanying drawings forming a part of this specification wherein like reference characters designate corresponding parts in the several views.

Fig. 1 is a fragmentary perspective view, partly from the rear and one side, illustrating the rear window and portion of a folding top for a convertible body in which the present invention is incorporated.

Fig. 2 is a fragmentary enlarged rear elevation of the window shown in Fig. 1, with portions broken away to show details of construction.

Fig. 3 is an enlarged fragmentary section taken substantially through lines 3—3 of Fig. 2, looking in the direction of the arrows.

Fig. 4 is a fragmentary side elevation, partially in section, illustrating the folding top and rear window shown in Fig. 1 in a folded condition.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated by way of example one embodiment of the invention as applied to a convertible type automobile 10 provided with a foldable or collapsible top assembly which may be of any conventional type comprising a flexible covering material 11 supported in the open position of the top by means of the usual upright bows, foldable side frame members and operating linkage. The covering 11 may be of any suitable fabric material, such as cloth or plastic material. In accordance with conventional practice the top is foldable rearwardly into a compartment or space at the rear of the rear seat of the vehicle so as to be largely concealed when the top is down. The foldable top 11 includes a back portion 12 which, when the top is open as shown in Fig. 1, slopes forward and upward from an attachment at 13 along the front edge of the automobile rear deck 14.

The back portion 12 of the top is cut out to provide a rear window opening within which is mounted a rear window comprising foldable glass sections constructed in accordance with the present invention. In the present instance the rear window comprises two glass sections 15 and 16, each being laminated to provide a safety glass panel of any conventional type. The adjacent parallel edges of these sections are spaced apart a suitable distance, as for example approximately one inch, along a horizontal centrally located fold line indicated at 17'.

Also in the present instance, each section 15 and 16 respectively comprises paired glass plates or laminations 15a, 15b and 16a, 16b, as shown in Fig. 3. A lamination 17 consisting of two superimposed and consolidated sheets of plastic material 17a, 17b is interposed between the paired plates 15a, 15b and 16a, 16b. The plastic sheet 17 is common to both panels 15 and 16 and hence has the portion 17' bridging the gap or space between the panels to form the hinge section. The sheet 17 is of such size as to project beyond the outer edges of the glass panels 15 and 16 to provide a continuous projecting attaching strip extending along the top, bottom and sides of the rear window panel assembly. Any suitable material which is flexible, transparent, and adapted to be permanently bonded to the glass laminations may be employed for the sheet 17. For example the latter may be composed of a vinyl ester resin, such as polyvinyl acetate, polyvinyl chloride, polyvinyl chloride-vinyl acetate, cellulose acetate or other clear resinous material suitable for laminated glass purposes.

Interposed and bonded between the portions of the consolidated plastic bonding layers 17a, 17b which project from the marginal edges of the window panel is a reinforcing strip 18 of suitable flexible material, such as a tough closely woven fabric. Also interleaved between the layers 17a, 17b in juxtaposition to the portions of the strip 18 above and below the sections 15, 16, and between the portions of these layers at the hinge section 17' are supplementary flexible fabric strips 18a preferably comprised of strong coarsely woven fibers. A woven glass fabric for the strips 18a has proven satisfactory because of its comparatively high tensile strength, although other fabrics of comparable strength such as rayon, nylon, and the like may be employed.

As indicated in Figs. 2 and 3, the marginal strips 18a are generally coextensive with the adjacent portions of the strips 18, but extend inward and are firmly anchored between the corresponding adjacent edges of the glass layers 15a, 15b and 16a, 16b as the case may be. As a result the marginal portions of the flexible bonding layers 17a, 17b, which extend above and below the window sections 15 and 16 respectively and accordingly are not supported and reinforced by the glass panels of the latter, are reinforced by the strips 18a to prevent being objectionably stretched or pulled away bodily from said panels 15 and 16 as a consequence of the stretching and bending forces exerted thereon when the rear window is folded during operation of the top. Inasmuch as the primary stretching and folding forces exerted on the marginal extensions of the layers 17a, 17b during operation of the top are directed generally parallel to the vertical longitudinal median plane of the vehicle body, rather than laterally, it is only necessary to reinforce the upper and lower marginal extensions of the layers 17a, 17b by the strips 18a.

Similarly to the marginal strips 18a, the intermediate strip 18a at the fold or hinge 17' extends a short distance above and below the latter between the adjacent edges of the plates 15a, 15b and 16a, 16b, whereat the upper and lower edges of the said intermediate strip 18a are anchored to prevent rupturing or objectionable stretching of the plastic bonding layer comprising the hinge 17' during ordinary folding or unfolding of the collapsible top.

The width of the reinforcing strip 18 and of the marginal projecting portions of the bonding sheet 17 will be determined in accordance with the particular requirements of the window and its mounting within the rear window opening in the flexible material 12 of the collapsible top. In the usual instance, a projecting width of approximately one or two inches is adequate for attachment of the marginal strip with the top fabric 12 by sewing, stapling, riveting or similar means.

The attachment is accomplished in the present instance by placing the marginal edges of the reinforced bonding sheet 17 in abutting or juxtaposed relation with the adjacent edges of the top fabric 12 around the rear window opening. External fabric reinforcing strips 19a and 19b are placed around the marginal edges of the window panel on the inside and outside thereof respectively overlying the juxtaposed portions of the top 12 and reinforced bonding sheet 17. The several layers are then suitably stitched together along a plurality of seams 20 to complete the assembly.

By virtue of the reinforcing fabric strip 18 bonded between the sheets 17a, 17b, the stitches 20 will not pull out of the marginal edges of the plastic sheet 17 when subjected to the ordinary rupturing forces resulting from folding the collapsible top and the rear window. A rugged long lasting attachment between the window panel and the flexible top material 12 is thus achieved.

In order to present a rounded continuous contour between the marginal edges of the glass layers 15a, 15b, 16a, 16b and the projecting portions of the bonding sheet 17, the plastic material of the latter is thickened or built up along said edges, as indicated at 21 in Fig. 3. Such a continuous contour may also be achieved by suitably chamfering the marginal edges of the glass layers if desired.

In fabricating the rear window, the two original layers 17a, 17b which are eventually consolidated to comprise the layer 17 are interposed face to face in partially cured condition between the glass laminations 15a, 15b and 16a, 16b of the two panels 15 and 16, with the latter spaced as at 17' and the marginal portions of the layers 17a, 17b projecting from the panels 15 and 16 as described above. The fabric reinforcing strips 18 and 18a are also placed between the plastic layers 17a, 17b as described. Thereafter the several laminations are consolidated together under pressure and heat so as to bond the laminations together permanently in accordance with conventional practices in fabricating laminated safety glass.

From the foregoing it will be seen that the intermediate lamination 17 of plastic material which bonds the glass laminations together is common to both laminated glass panels 15 and 16. Since the plastic layer 17 is flexible though somewhat stiff and viscous, it will bend in the area 17' between the spaced edges of the panels 15 and 16. Hence when the top is folded rearwardly, the panels 15 and 16 will fold together into a compartment at the rear of the tonneau and will occupy but approximately one half the space which otherwise would be taken up by the rear window if it were formed with a single solid glass panel.

The portions of the layers 17 projecting from the plates 15, 16 and reinforced by the fabric strips 18 and 18a bonded therein serve as a simple, feasible and efficient marginal attachment strip and hinge adapted to resist the forces of repeated folding and unfolding operations without objectionable stretching or rupturing and pulling away from the glass panels.

I claim:
1. In a folding top for a convertible automobile body, a folding rear window for said top comprising a pair of laminated transparent panel sections spaced apart along horizontal edges, a plastic sheet having portions forming laminations for both panel sections, said sheet also having projecting portions extending from said panel sections including a portion bridging the space between said horizontal edges and hingedly connecting the panel sections together and also including marginal portions projecting outward from the marginal edges of the window to provide a hinge connection attachable to the top material adjacent said marginal window edges, foldable fabric reinforcing material embedded in the marginal projecting portions of the plastic sheet, and supplementary transparent reinforcing material comprising a coarsely woven foldable fabric embedded in the projecting portions of the plastic sheet above and below the laminated panel sections and interleaved between the layers thereof along the adjacent edges thereof.

2. In a convertible vehicle body, a foldable top having a rear window opening, a window for said opening comprising a plurality of laminated transparent panels, the edges of adjacent panels being separated from each other, a foldable plastic lamination common to said panels and having intermediate portions bridging the separated edges of said panels to provide a hinge connection therebetween, said plastic lamination also having marginal portions projecting outward from the marginal edges of said window, a foldable fabric reinforcing strip embedded in said marginal portions of said plastic lamination and cooperable therewith to comprise reinforced attachment tabs foldable along the edges of the window when the top is folded, and supplementary transparent reinforcing material comprising an open weave foldable fabric embedded in said intermediate and marginal portions of the plastic lamination and interleaved between the layers of said panels along the adjacent edges thereof, and means securing said tabs to the material of the top around said window opening.

3. A folding window for the folding top of a convertible vehicle body comprising a plurality of laminated transparent window panels, the edges of adjacent window panels being separated from each other, a foldable plastic lamination common to said window panels and having intermediate portions bridging the separated edges of said window panels to provide a hinge connection therebetween, said plastic lamination also having marginal portions projecting outward from the outer edges of said window, a foldable reinforcing material embedded in said marginal portions of said plastic lamination, and a supplementary reinforcement comprising an open weave foldable fabric of transparent material embedded in said intermediate and marginal portions of the plastic lamination and interleaved between the layers of said laminated window panels along the adjacent edges thereof.

FRANK S. SPRING.

References Cited in the file of this patent
UNITED STATES PATENTS

| Number | Name | Date |
|---|---|---|
| 1,074,297 | Sedlacek | Sept. 30, 1913 |
| 1,253,525 | Pianko | Jan. 15, 1918 |
| 1,302,500 | Blomberg | May 6, 1919 |
| 1,359,136 | White | Nov. 16, 1920 |
| 1,929,892 | Kellner | Oct. 10, 1933 |
| 2,002,596 | Westrope | May 28, 1935 |
| 2,202,690 | Fix | May 28, 1940 |
| 2,374,057 | Watkins | Apr. 17, 1945 |
| 2,560,493 | Spring | July 10, 1951 |